United States Patent [19]

Arnaud et al.

[11] Patent Number: 4,743,110

[45] Date of Patent: May 10, 1988

[54] LASER TELEMETRY AND DOPPLER MEASUREMENT SYSTEM WITH PULSE COMPRESSION

[75] Inventors: Georges Arnaud, Orsay; Léon P. Robin, Massy; Jean L. Meyzonnette, Jouy-en-Josas; Bertrand Remy, Issy-les-Moulineaux, all of France

[73] Assignee: Thomson CSF, Paris, France

[21] Appl. No.: 593,305

[22] Filed: Mar. 26, 1984

[30] Foreign Application Priority Data

Mar. 29, 1983 [FR] France ............................. 83 05142

[51] Int. Cl.[4] ........................... G01C 3/08; G01P 3/36
[52] U.S. Cl. ..................................... 356/5; 356/28.5; 356/28
[58] Field of Search .................. 356/28.5, 28, 5, 4; 342/82-84, 132, 127, 99, 100

[56] References Cited

U.S. PATENT DOCUMENTS

| | | | |
|---|---|---|---|
| 2,997,708 | 8/1961 | Smith | 342/82 |
| 3,363,248 | 1/1968 | Nicodemus | 342/201 |
| 3,540,045 | 11/1970 | Taylor | 342/82 |
| 3,889,261 | 6/1975 | Sirven | 342/127 |
| 3,950,100 | 4/1976 | Keene et al. | 356/28.5 |
| 4,005,417 | 1/1977 | Collins | 342/132 |
| 4,042,925 | 8/1977 | Albanese et al. | 342/132 |
| 4,190,362 | 2/1980 | Dubrunfaut | 356/5 |
| 4,299,484 | 11/1981 | Holzapfel | 356/28.5 |
| 4,403,220 | 9/1983 | Donovan | 342/84 |
| 4,413,905 | 11/1983 | Holzapfel | 356/5 |
| 4,552,456 | 11/1985 | Endo | 356/28.5 |

OTHER PUBLICATIONS

Hoge, "Integrated Laser/Radar Satellite Ranging & Tracking System," *Applied Optics*, 10/74, pp. 2352-2357.

Primary Examiner—Stephen C. Buczinski
Assistant Examiner—Melissa Koltak
Attorney, Agent, or Firm—Cushman, Darby & Cushman

[57] ABSTRACT

Laser telemetry and Doppler measurement apparatus using pulse compression has a transmitter for providing a periodic pulsed transmission laser wave having a pair of pulses, one pulse being frequency modulated on one side of a main frequency $F_E$, and the other pulse being frequency modulated on the other side of the main frequency $F_E$. The transmitter also provides a reference laser wave having a frequency $F_L$. A photomixer is adapted for superheterodyne reception of the reference laser wave and a return laser signal which has been reflected from a target. The return laser signal has a Doppler shift frequency $F_D$. The photomixer provides a beat signal having a frequency $F_I$ plus $F_D$, where $F_I$ is an intermediate frequency. A Doppler aquisition loop transposes the beat signal frequency and provides a transposed signal to compensate for the Doppler shift. The Doppler acquisition loop provides a coarse compensation signal having a frequency near the frequency $F_D$. Under target tracking conditions, the Doppler acquisition loop then provides an automatic fine compensation signal which compensates for the Doppler difference $\Delta F_D$ which exists between the compensation signal frequency and the Doppler shift frequency. Receiving and processing means then receive the transposed signal and provide an output signal indicative of the distance to the tracked target and the Doppler shift frequency of the target.

10 Claims, 4 Drawing Sheets

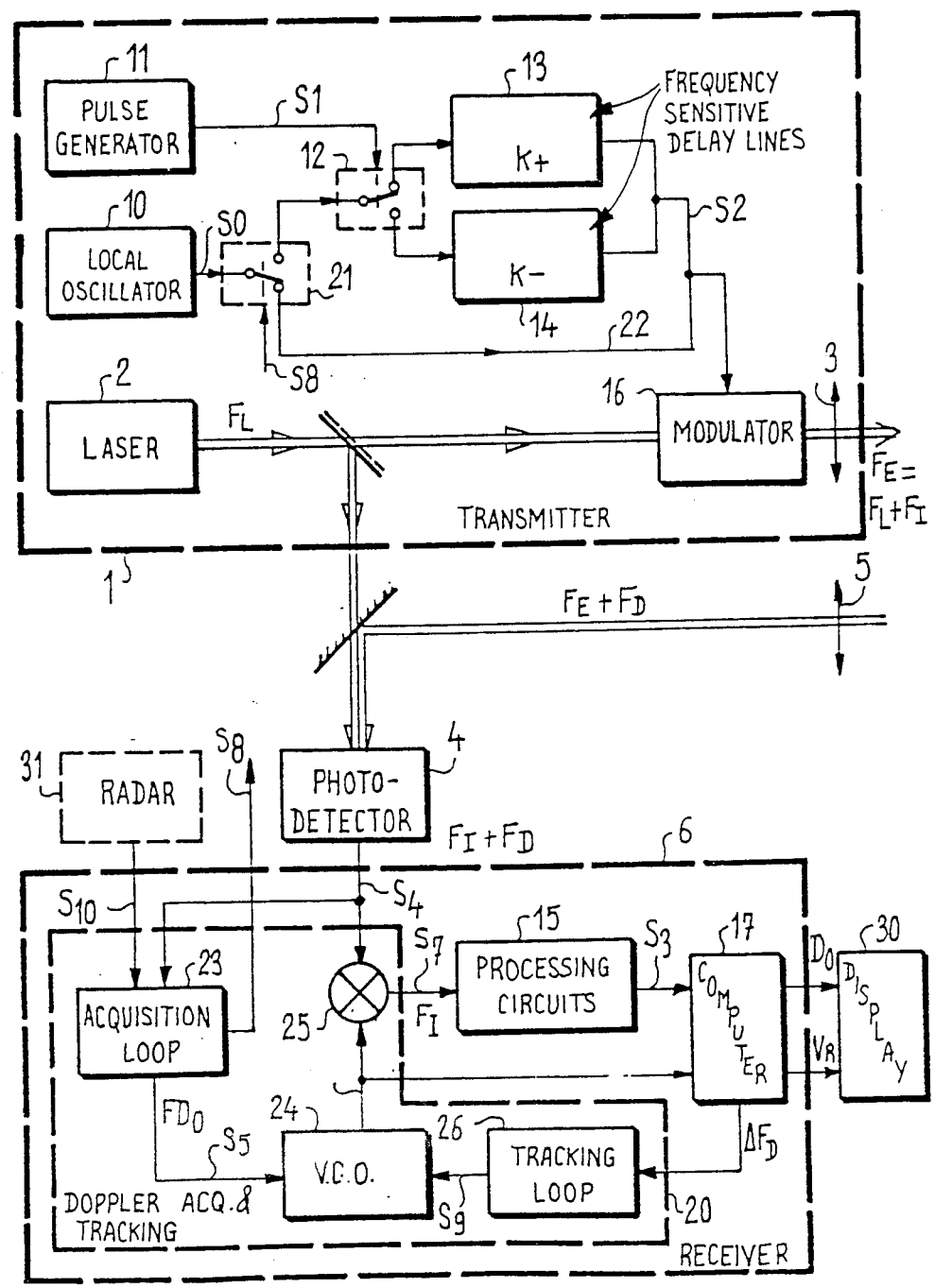
FIG_1

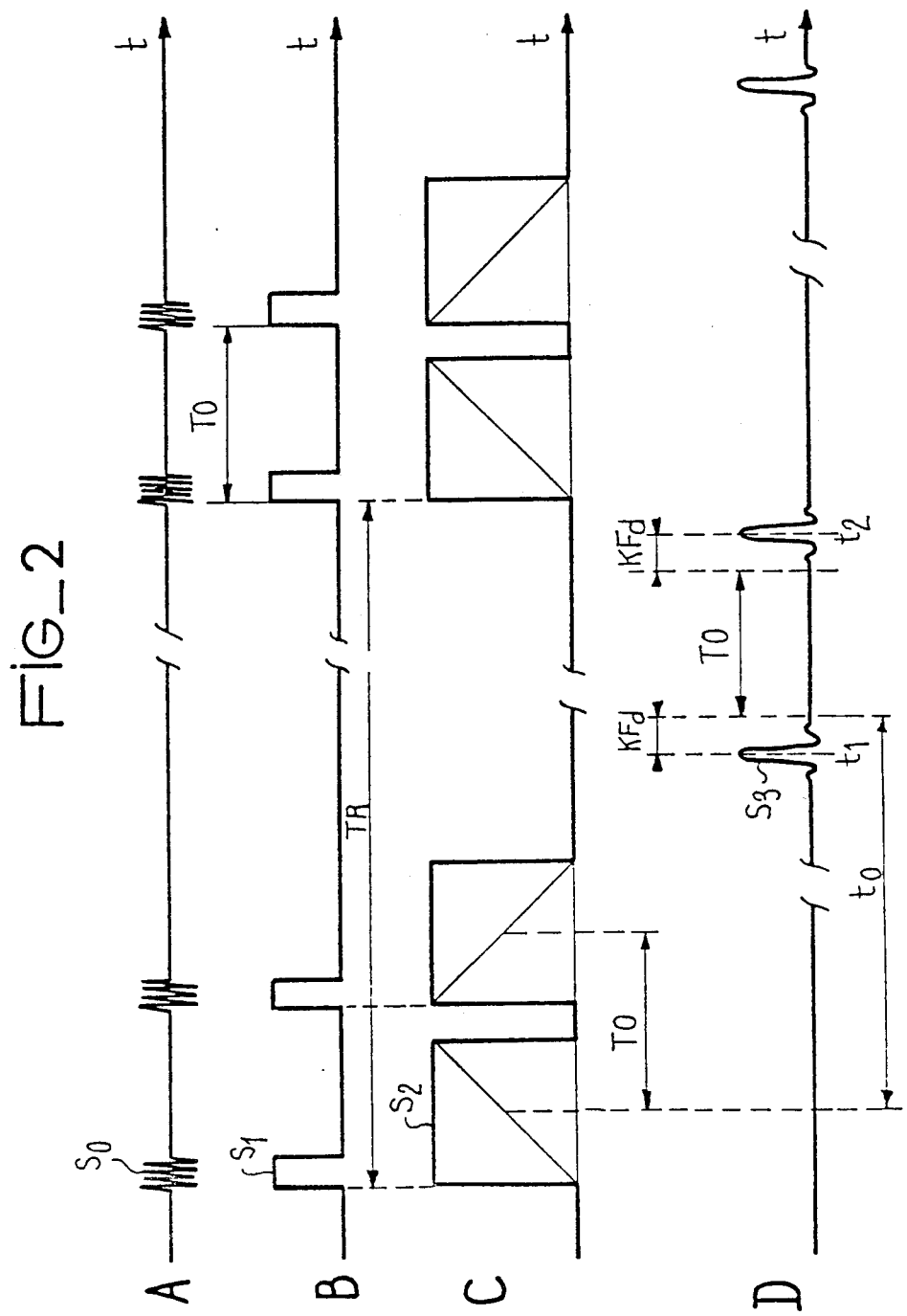

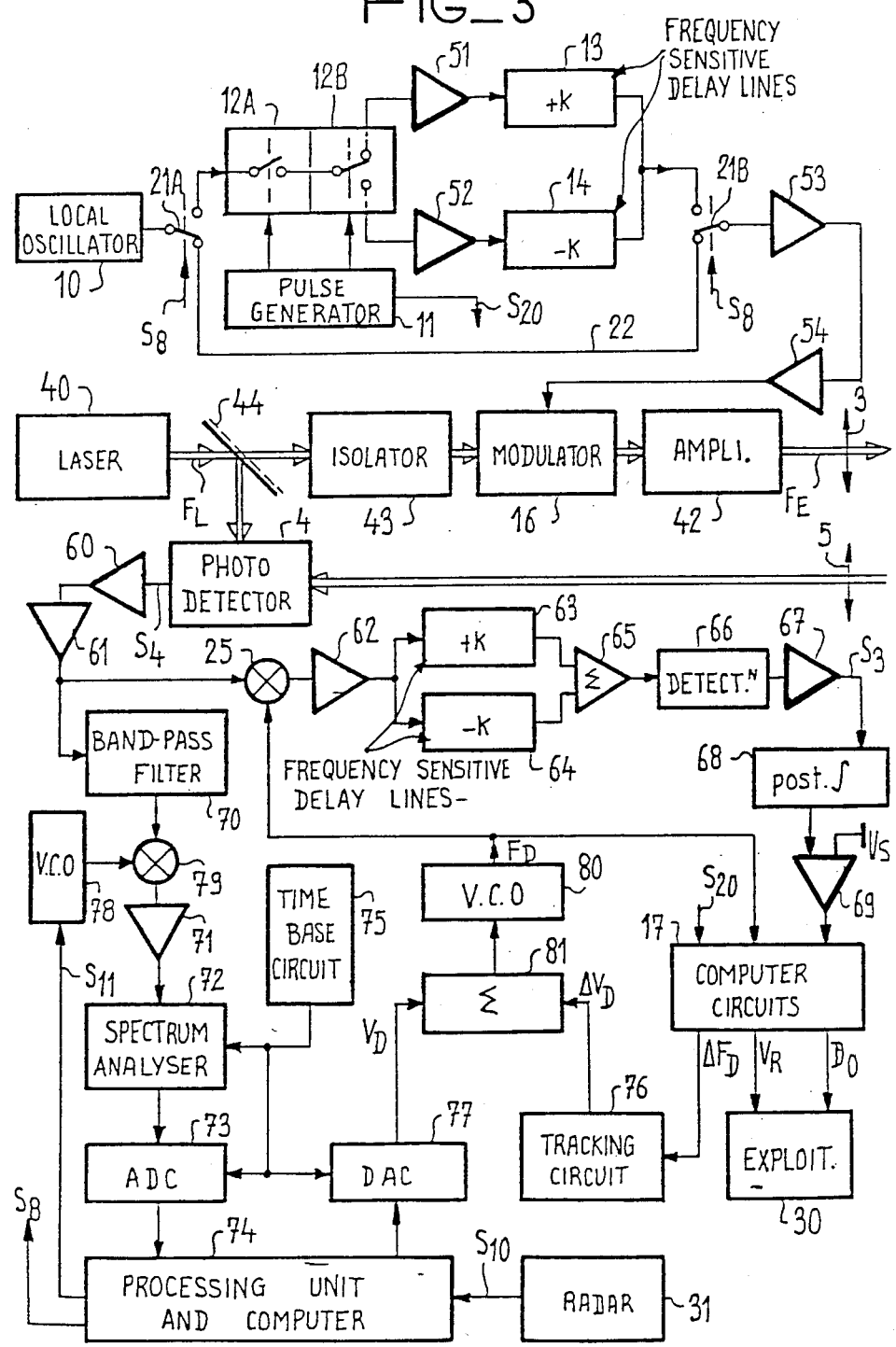

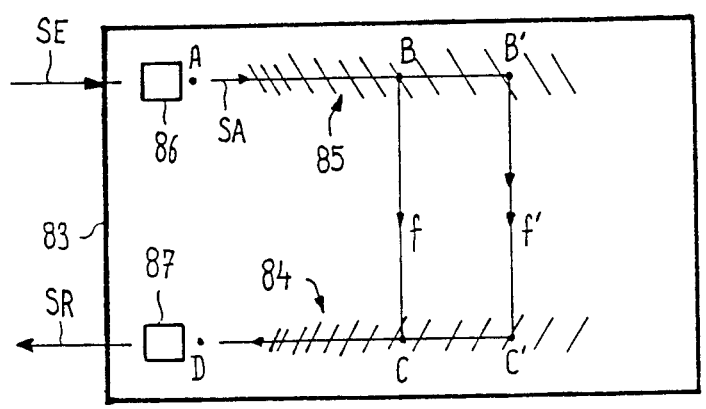
FIG_4
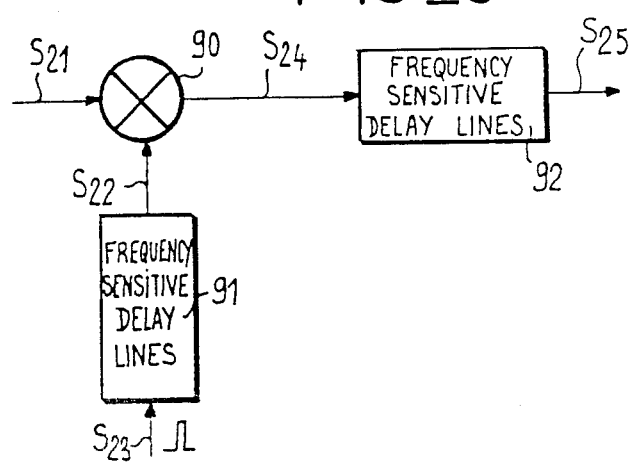
FIG_5

LASER TELEMETRY AND DOPPLER MEASUREMENT SYSTEM WITH PULSE COMPRESSION

BACKGROUND OF THE INVENTION

1. Field of the Invention

The present invention relates to improvements in pulse-compression systems for laser telemetry and Doppler measurement which are primarily intended to equip fire control systems.

More specifically, the invention is concerned with a system of this type in which means are provided for acquisition and tracking of the Doppler frequency shift generated by the radial velocity component of the moving target that is being tracked.

2. Description of the Prior Art

In the case of a radar system, the Doppler frequency shift hardly produces any disturbances, taking into account the wavelength values of the radar system and the medium-frequency passband of the receiving circuits.

On the other hand, in the case of laser telemeters or lidar systems, the wavelength is very short and the Doppler frequency which is given by the expression $F_D = 2V_R/\lambda$ becomes very high in respect of small variations in the radial velocity $V_R$. By way of example, in the case of a lidar having a wavelength $\lambda = 10.59$ $\mu$m, the Doppler frequency shift varies by 0.19 MHz each time the velocity varies by one meter per second. In consequence, the limits of the medium-frequency passband of the receiver are reached in a very short time. For example in the case of a passband of $\pm 12.5$ MHz on each side of an intermediate center frequency of 150 MHz, these limits are reached in respect of a radial velocity of the order of $\pm 240$ km/hr. This results in narrow operating limits beyond which there is a loss of information of the signal which is no longer processed by the receiver. In consequence, the system presents difficulties arising from its basic design concept. One solution would be to increase the bandwidth downstream of the photomixer with all the disadvantages attached to this solution.

French patent Application No. 79 19 970 of Aug. 3rd, 1979 granted under No. FR-A-2 462 717 disclosed a system for laser telemetry and Doppler measurement with pulse compression, which permits measurement of both distance and radial velocity and is more particularly adapted to unambiguous discrimination of a plurality of detected targets. In this system, provision is made at the transmitter for two pairs of delay lines in which the time delays are variable as a function of the frequency and which have slopes $+K$ and $-K$, $+K'$ and $-K'$ respectively, the same set of lines being employed in conjugate relation at the receiver. By means of these delay lines, two transmission pulses can be produced periodically by employing a different pair of lines from one period to the next and a reliable measurement of the distance and radial velocity of each detected target can be deduced from the instants of reception of echos by means of a simple calculation with removal of ambiguity.

In practice, however, this solution is applicable only to targets which are traveling at a relatively moderate speed.

By reason of the dispersive lines, the process employed is in fact suitable only within a range limited to approximately $\pm 2$ MHz. This corresponds to radial velocities which do not exceed $\pm 10$ m/sec, that is to say velocities in the vicinity of $\pm 36$ km/hr. This system is therefore more particularly applicable to surface-to-surface systems and not to surface-to-air or air-to-air systems in which high-speed targets may travel at speeds of the order of several Mach numbers.

Moreover, French patent Application No. 82 00238, published as French Pat. No. 2 519 771 relates to a pulse-compression lidar which is equipped with means for acquisition and tracking of moving targets and retains the characteristics of matching and sensitivity of the receiver. These means involve frequency transposition of a local oscillation laser wave and locking of the transposed local frequency when beating by superheterodyne mixing with the reception light signals produces an electric signal at the intermediate frequency $F_I$. After acquisition, the transposition frequency $F_T$ is controlled automatically in dependence on the Doppler shift. The target acquisition and tracking means comprise an acoustooptical delay-line device controlled by sawtooth signals via a frequency synthesizer. At the time of acquisition, the receiver initiates locking of the local beat frequency $F_L + F_T$, then produces automatic adjustment of the transposition frequency $F_T$ to the instantaneous value of $F_D$ (Doppler tracking).

The major drawback of this solution lies in the length of time of the search and acquisition stage during which a frequency excursion is carried out by scanning of the synthesizer. This frequency excursion in fact makes it possible to cover the entire processing range of Doppler frequencies and the search time is therefore related to the location of the Doppler value to be found within this range. This search time is longer as coincidence takes place nearer the end of the frequency excursion.

SUMMARY OF THE INVENTION

The object of the invention is to overcome the disadvantages mentioned above by equipping the laser telemetry and Doppler measurement system with means for acquisition and tracking of moving targets which permit rapid acquisition followed by automatic compensation for the Doppler shift produced by the moving target, said compensation being produced electrically downstream of the receiving photomixer.

In accordance with the invention, it is proposed to construct a laser telemetry and Doppler measurement system with pulse compression, comprising means for transmission and local oscillation provided with a laser generator for producing a first laser wave frequency-modulated on each side of a mean value $F_E$, said first laser wave being intended for transmission, and for producing a second unmodulated laser wave having a frequency $F_L = F_E - F_I$ which is intended for superheterodyne reception, where $F_L$ is the local frequency and $F_I$ is the intermediate center frequency. The system further comprises a photomixer for mixing said local wave with the received light signals and producing a electric beat signal at the intermediate frequency, said signal being affected by a Doppler shift $F_D$ at the time of detection of a moving target. A receiver supplied by said beat signal comprises processing and computing circuits for measuring the distance and Doppler frequency of detected targets. The system also comprises means for acquisition and Doppler tracking of a moving target. These means are interposed on the electric signal path downstream of the photomixer in order to produce a frequency transposition from $(F_I = F_D)$ to $F_I$ of the beat signal, where $F_D$ in the foregoing expression corresponds in value and in sign, at the time of acquisition proper, to the instantaneous Doppler shift $F_{Do}$. This acquisition stage is immediately followed by a tracking stage during which a signal delivered by the receiver produces automatic control of the signal thus transposed to the intermediate frequency $F_I$ by compensating for the instantaneous variation in the difference value $\Delta F_D$ of the Doppler shift with respect to the acquisition value $F_{Do}$.

BRIEF DESCRIPTION OF THE DRAWINGS

Other features of the invention will be more apparent on consideration of the following description and accompanying drawings, wherein:

FIG. 1 is a general block diagram of a pulse-compression laser system in accordance with the invention;

FIG. 2 is a schematic diagram of waveforms relating to operation of the system;

FIG. 3 is a block diagram showing one embodiment of a pulse-compression laser system in accordance with the invention;

FIG. 4 is a schematic diagram of an electroacoustic delay line employed in the laser system;

FIG. 5 is a schematic diagram showing a high-speed spectrum analyzer employed in the laser system.

DETAILED DESCRIPTION OF THE INVENTION

In the general diagram of FIG. 1, the block 1 represents means for transmitting two light waves from at least one laser generator 2, a first laser wave having a frequency $F_L$ and frequency-modulated on each side of a mean value $F_E$. This first light wave is preferably modulated in accordance with a linear sawtooth law of increasing then decreasing magnitude, which is renewed periodically. Said light wave is transmitted to a radiating device 3 constituted by a suitable optical system such as, for example, a catadioptric optical system of the Cassegrain type. The transmission means 1 also generate a second unmodulated laser wave having a frequency which is given by the expression $F_L = F_E - F_I$. This second wave can be constituted by a fraction of the laser wave $F_L$ and constitutes a local wave to be applied to the mixer 4 in order to achieve a superheterodyne reception and to produce the intermediate center frequency $F_I$ by heterodyning or beating with a reception wave. The photomixer device 4 receives the reception light signals via an optical receiving system 5 which is coaxial with the optical transmission system 3. The beat signal S4 at the frequency $F_I + F_D$, where $F_D$ is the Doppler shift of the illuminated target, is transmitted to the receiver 6. The transmitting means 1 and receiving means 6 are so arranged as to produce the pulse-compression operation.

In accordance with known techniques, the means for transmission and reception in a pulse-compression lidar system utilize the properties of dispersive delay lines. It is also known that, when the target has a radial velocity to which corresponds a Doppler shift $F_D$, it is demonstrated that the compressed pulse is displaced in time by a value equal to $-KF_D$ in an algebraic value, where K is the characteristic constant of the dispersive delay line (K higher than zero for a modulation in which the frequency increases with time, K lower than zero when this is not the case). The Doppler-distance uncertainty is removed by successively transmitting two pulses, one pulse being frequency-modulated with increasing frequencies and the other pulse being frequency-modulated with decreasing frequencies. If $t_1$ and $t_2$ designate the instants of occurrence of echos relating to the lines having slopes $-K$ and $+K$ respectively (as shown in FIG. 2D), if $t_o$ is the time interval which elapses between the instants of transmission and reception of the same pulse and if $T_o$ is the time interval which elapses at the time of transmission between two pulses of the same pair, there can accordingly be deduced the following relations (zero on the time coordinate at the instant of the first pulse):

$$t_1 = t_o - KF_D$$

$$t_2 = t_o + T_o + KF_D$$

the values of $t_o$ and FD:

$$t_0 = \frac{t_1 + t_2 - T_0}{2}$$

$$F_D = \frac{t_2 - t_1 - T_0}{2K}$$

from which are derived the values of the distance $D_o$ and of the radial velocity $V_R$ by:

$$D_0 = \frac{c}{2} t_0$$

and $$V_R = \frac{\lambda}{2} F_D$$

In short, $D_o$ and $V_R$ are deduced from the values of $t_1$ and $t_2$.

Since the values of $t_1$ and $t_2$ are known with a degree of accuracy which depends on the signal-to-noise ratio, it is necessary over a long range to perform a post-integration with a maximum time-duration which is compatible with the performances of the pointing or angle-tracking device.

In accordance with the invention, the transmission means comprise a local oscillator 10 and a pulse generator 11 for alternately switching the output of the oscillator via a switching circuit 12 to a first dispersive delay line 13, then to a second delay line 14, the respective slopes of which are $+K$ and $-K$. The signals designated by the references S0, S1 and S2 are indicated in FIG. 2. The local signal S0 considered at the output of the switching circuit 12 is controlled by the two pulses S1 at each transmission period TR. The signal S2 is obtained after passage through the dispersive delay lines 13 and 14. The slope indicated represents a linear frequency variation (Chirp function) which is respectively increasing and decreasing. The video signal S3 is the signal collected at the output of the processing circuits 15 in which compression and video detection take place.

The signal S2 is applied to an acoustooptic modulator 16 for frequency-modulation of the laser beam. In regard to the operation of the acoustooptic modulator, relevant information can be obtained from many technical publications. Worthy of particular mention on this subject is the article by Robert Adler published in the IEEE Spectrum Review, May 1967 issue, pages 42 to 47, entitled "Interaction Between Light and Sound".

The mixer 4 consists of a photodetector which receives a light signal at the frequency $F_L$ at one input, said signal being derived from the wave emitted by the laser via an optical separator, which receives the light signal at the frequency $F_E+F_D$ at the other input, and which delivers the beat signal S4 at the output.

In accordance with the invention, the system is arranged with means for acquisition and tracking of the Doppler frequency shift $F_D$ associated with the radial velocity of a moving target. These acquisition and tracking means are essentially constituted by means for transposing the frequency $F_I+F_D$ of the beat wave S4 emerging from the photomixer 4 to the intermediate value $F_I$ in order to compensate for the Doppler shift $F_D$ which is present. These transposition means comprise the block 20 within the receiver and the switching circuit 21 and the connection 22 at the transmitter. During the search and Doppler acquisition stage, the switching circuit 21 directly transmits the local wave S0 via the connection 22 to the acoustooptic modulator 16 in order to produce a continuous transmission mode or so-called CW transmission of the laser wave $F_L$ which is modulated without interruption at the constant frequency of the oscillator 10. The block 20 is composed of a Doppler acquisition loop 23 provided with a spectrum analyzer which covers the processed Doppler-frequency band for rapidly detecting the Doppler frequency of the beat signal S4 with a limited degree of accuracy and for producing coarse compensation. This loop supplies via its output S5 a local voltage-controlled oscillator 24 (VCO), the output S6 of which is applied to a mixer 25 which also receives the signal S4. There corresponds to the voltage S5 a frequency $F_{Do}$ of the local signal S6 which is sufficiently close to the incident Doppler shift (which is the usual case since there is only a slight probability of exact correspondence), with the result that the output S7 of the mixer 25 is included in the reception band.

From this instant, the acquisition phase is ended, the action of the loop is automatically blocked, its output S5 remains in the same state and it delivers a control signal S8 which activates the switching circuit 21 of the transmitter. The operation of the system then changes over to the tracking mode in order to carry out, with modulated-frequency transmission and matched reception, the compensation for end of Doppler shift $\Delta F_D$ corresponding to the difference value between the instantaneous Doppler frequency $F_D$ and the value $F_{Do}$ of acquisition locking-on. The corresponding means comprise a second loop which has the function of initiating the operation of a computation circuit 17 for calculating the differential Doppler value $\Delta F_D$ from the detected video signal S3, and a control circuit 26 for carrying out Doppler tracking by delivering to the local transposition oscillator 24 a control voltage S9 corresponding to said instantaneous difference value $\Delta F_D$. The computation circuit 17 normally serves to produce the data relating to distance $D_o$ and radial velocity $V_R$ (or Doppler frequency $F_D$) of the detected target in accordance with the relations given earlier for the purpose of ancillary processing of said data in a visual display device 30, for example. Since the receiver is controlled in dependence on the Doppler frequency, $F_D$ represents (in the formulae given above) only the difference value $\Delta F_D$ between the intermediate center frequency $F_I$ of the receiver and the center frequency of the received signal, these values being collected downstream of a Doppler compensation mixer 25. In order to compute the real value of the Doppler frequency, it is necessary to take into account the frequency of the VCO 24. The output S6 of this oscillator gives said real value with respect to a reference frequency of the VCO (zero Doppler).

The laser telemeter can be combined with an ancillary device 31 such as a radar system, for example, which is capable of providing beforehand a measurement of the Doppler frequency $F_D$ with a lower degree of accuracy. The signal S10 corresponding to this measurement can accordingly be employed in order to produce coarse locking-on as desired. To this end, use is made of a spectrum analyzer, the passband of which is of appreciably smaller width, subject to the need for a frequency transposition of the signal S4 derived from the local mixer 4 as will hereinafter be more clearly understood.

FIG. 3 relates to one example of construction of the pulse-compression laser telemetry and Doppler measurement system equipped with acquisition and tracking means.

The operation of the dispersive delay lines is equivalent to an autocorrelation and the presence of a small Doppler component results in a drift in time of the autocorrelation peak which can be employed for the measurement. At high values of shift of the Doppler frequency $F_D$, it is readily demonstrated that the quality of the autocorrelation function which constitutes the compressed pulse undergoes rapid degradation by flattening of the main lobe and upward displacement of the side lobes. It is further apparent that drift of a power oscillator which produces the wave $F_E$ with respect to a local oscillator which would be employed to produce the wave $F_L$ would have the same effect with, in addition, the introduction of a systematic error in the measurement of $F_D$. All these problems are solved in a laser system equipped in accordance with the invention, that is, in the design solution illustrated in FIG. 3.

In this embodiment, the system comprises only one laser generator which constitutes a power master oscillator 40. The modulator 16 of the acoustooptic type is located outside the laser cavity in this configuration. Said modulator may be followed if necessary by a power amplifier 42 and is preceded by a Faraday isolator 43 which serves to reduce parasitic back-couplings caused by residual reflections and scattering within the modulator. The partially-transparent mirror 44 serves to reflect part of the energy of the unmodulated transmission beam of frequency $F_L$ in order to constitute the local wave which is directed to the mixer 4. The modulation circuits connected as shown in the figure mainly comprise the following elements: a 75-MHz quartz oscillator 10; a modulator 12A controlled by a train of two pulses of small width (for example of the order of 50 nsecs) at the transmission recurrence frequency TR; a switching device 12B for directing signals to the dispersive delay lines having opposite slopes ; a pulse generator 11 for delivering among others the distance-time measurement start pulse S20 to the computation circuit 17 and controlling the switching devices 12A and 12B; a pair of dispersive delay lines 13, 14 having opposite slopes $+K$ and $-K$ and their power amplifiers 51 and 52; an amplifier chain 53 with limiter 54 for delivering the modulation signal to the acoustooptic modulator 16; and a diode switching device 21A, 21B which permits either continuous transmission at the intermediate frequency of 150 MHz during acquisition or frequency-modulation transmission.

While tracking is in progress, the signal applied to the acoustooptic modulator 16 is thus linearly frequency-modulated on each side of a center frequency $F_I$ and alternately with two symmetrical dispersion slopes by employing the passive generation mode comprising the two electroacoustic delay lines 13 and 14. The pairs of pulses thus modulated are separated by a time interval which is compatible with an unambiguous variation in target distance.

The receiver subassembly mainly comprises the following elements connected as shown in FIG. 3: a low-noise preamplifier 60 for the output signal of the photodetector 4, which is a wideband function; a wideband linear amplifier chain 61; a BLU mixer 25; a voltage-controlled oscillator 80 (VCO) controlled from the spectrum analyzer 72 or from the differential Doppler signal.$\Delta F_D$; a power amplifier 62; a pair of amplitude-weighted dispersive delay lines 63, 64 having opposite slopes; a summing amplifier 65 for summation of the two channels; an envelope detector 66; a video amplifier 67; a processing unit comprising a post-integration function 68; a threshold comparator 69, the threshold level of which establishes the probability of false alarm and detection; a digital module 17 for computing the distance and radial velocity; and a Doppler-tracking control interface 76 of the transposition oscillator 80.

At the receiver, after optical heterodyning at 4, there is thus collected a medium-frequency (MF) signal which is centered on $F_I+F_D$, where $F_D$ is the Doppler frequency. Medium-frequency processing entails the use of a filtering system matched with the useful signal to be received and composed periodically of the two electroacoustic delay lines 63 and 64 which are conjugate to the transmission delay lines. Two compressed pulses (shown in FIG. 2D) are collected on the sum channel at each repetition. Said pulses have a width of the order of $1/\Delta F$ ($\Delta F$=modulation bandwidth) and are displaced by $-KF_D$ with respect to the position occupied by these pulses in the case of a stationary target (K=dispersion slope in seconds per Hertz).

The signal then undergoes an envelope detection followed by a post-integration process. After digital computation, the values of the distance $D_o$ and of the radial velocity $V_R$ of the target are displayed.

Since the Doppler bandwidth of the receiver is limited to a few MHz, a frequency transposition is carried out at 25 prior to MF amplification. After determination of the Doppler frequency $F_D$, this permits very rapid recentering of the received signal spectrum on the operating center frequency $F_I$ of the receiver (in accordance with the Doppler acquisition process). For the purpose of Doppler measurement, the laser beam undergoes a fixed-frequency translation and the form factor can attain 100%.

The chief elements employed in the Doppler acquisition chain are the following: a band-stop filter 70 centered on the frequency $F_I$ (case of zero Doppler); a wideband linear amplifier 71 for adapting the signal derived from the detection to the spectrum analyzer; a high-speed spectrum analyzer 72 for measuring the Doppler frequency within a band $\Delta F$ with a resolution of the order of $1/T$, where T is the portion of the continuous signal analyzed, this resolution being adapted on the one hand to the stability of the laser source and on the other hand to the Doppler selectivity band of the distance receiver; high-rate digital conversion circuits 73 for quantizing the analog output of the spectrum analyzer for processing in a digital and management processing unit 74; a time base 75 for initiating the operating cycles of the spectrum analyzer as well as sampling the analog signal derived from the frequency analyzer; and circuits for analog conversion of the control voltage $V_D$ corresponding to the detected Doppler shift $F_{Do}$.

In the system under consideration, the Doppler frequency of the received signal can vary within the range of $-20$ MHz to $+240$ MHz, for example. In order to ensure that the equivalent band of the reception matched filter is equal to that of the distance acquisition modulation signal, the Doppler selectivity of the distance receiver must be limited to a few MHz.

The use of a high-speed spectrum analyzer permits acquisition of the Doppler frequency of the received signal before it is possible to employ the distance acquisition chain with acceptable time intervals in the case of an air-to-air system.

Considering that an ancillary radar 31 cooperates and provides a predetermination of the Doppler frequency to within approximately 10 MHz, for example, and that a frequency translator 78–79 controlled by the management unit 74 is placed upstream of the spectrum analyzer 72, it is possible to limit the bandwidth of this latter with a resolution which is compatible with the Doppler selectivity of the distance receiver. The signal S10 delivered by the radar is transmitted to the management unit 74 which generates a corresponding control signal S11 to be applied to the voltage-controlled oscillator (VCO) 78. The output of this VCO is applied to the mixer 79 conjointly with the signal S4 produced by the filter 70

The practical application of heterodyne detection makes it possible to obtain a signal at a frequency containing the Doppler velocity information. In the case of the system proposed, it is considered that the selected intermediate frequency is 150 MHz. In the case of Doppler frequencies varying between $-20$ MHz and $+240$ MHz (relative target velocities within the range of 100 m/sec to 1200 m/sec), the frequency of the received signal will vary between 130 and 390 MHz.

Frequency analysis of the signal is performed by means of a spectrum analyzer 72 of the electroacoustic type which constitutes a known means and the principle of operation of which is recalled hereinafter with reference to FIGS. 4 and 5.

The electroacoustic spectrum analyzer makes it possible to obtain, practically in real time, the Fourier transform of a time-interval portion T of a signal which can be continuous at the input.

Frequency resolution of a system of this type is limited by the time interval T during which the signal undergoes physical analysis. This time interval is equal to $1/T$, which corresponds to the width of the Fourier transform of a monochromatic signal having a time-duration T. The frequency scale is converted linearly to a time scale and the spectral band B under analysis (B being dependent on the characteristics of the analyzer) extends at the output over a time interval T.

The operation of an analyzer of this type makes use of dispersive delay lines (of the type shown in FIG. 4). These delay lines have the property of delaying the different spectral components of a signal by different lengths of time. This is achieved by propagation of surface acoustic waves on a monocrystalline substrate 83 on which are etched two semi-reflecting arrays of grooves 84 and 85 having a continuously variable pitch.

The acoustic waves SR are obtained from the input signal SE by means of an input transducer 86 and propagate on the substrate along the array of grooves.

A spectral component of the acoustic wave will undergo a 90° reflection from the top array only at the point at which its wavelength corresponds to the pitch of the array (point B in the diagram). Constructive interference is in fact produced by the waves reflected by those grooves of the array which are adjacent to the point B.

The same will apply to said spectral component at the point C at which this component is reflected from said second array to the output transducer 87 and is reconverted by this latter to an electric signal SR.

A spectral component at a different frequency will follow another path such as, for example, the path AB' C' D having a different length, which accordingly entails a different transit time (since the propagation velocity of acoustic waves is not very high).

An effective time separation has thus been achieved between the different spectral components.

In its most simple design, the analyzer comprises two dispersive delay lines 91–92 and a multiplier 90 as illustrated schematically in FIG. 5.

The multiplier 90 forms the product of the input signal S21 times a linearly frequency-modulated signal S22 of duration T or so-called Chirp signal obtained as response to a Dirac pulse S23 applied to the first delay line 91.

The signal S24 thus obtained drives the second delay line 92 which produces signal convolution with a Chirp function. The output S25 directly supplies the Fourier transform of the input signal, that is, to within the nearest phase factor but this is unessential when consideration is given solely to the amplitude of the Fourier transform as in this instance.

The frequency resolution is 1/T in the frequency scale. This corresponds to a physical time duration at the output of the analyzer of 1/B in the time scale, where B is the band being scanned.

The time reference for the output is given by the Dirac pulse which drives the first delay line.

The received signal of duration $T_1$ is sampled by the spectrum analyzer at a period T. At each interval T, the spectrum analyzer delivers a signal which is characteristic of its frequency. Each signal can then be converted to digital form in the conversion circuit 73 and stored in the unit 74 (shown in FIG. 3).

If the ratio $T1/T = K$ is higher than 1, K signals are stored and can undergo incoherent addition within the storage unit. This method permits post-integration at 74, thereby producing a very substantial improvement in the signal-to-noise ratio and therefore in the range of the device.

The spectrum analyzer is characterized by the frequency band B to be analyzed and the frequency resolution $F = 1/T$, where T is the time of analysis of the spectrum.

The product B·T is also characteristic of the analyzer since it represents the number of analyzable points in a frequency band B.

The laser telemetry and Doppler measurement system described in the foregoing extends to alternative embodiments in accordance with the distinctive features disclosed and included within the scope of the invention. In particular, consideration can be given to the use of two lasers, namely a power laser for producing the frequency-modulated wave at the frequency $F_E$ and a second laser for constituting a local oscillator and delivering the unmodulated wave at the frequency $F_L$. The power laser can produce either internal or external modulation. In the case of external modulation, the parasitic transmission/reception coupling arising from residual reflections and scattering at the level of the modulator is attenuated to the maximum extent, subject to a disadvantage arising from the need to employ a second laser and a frequency control loop in order to maintain the difference $F_E - F_L = F_I$. This loop and likewise the control circuit 26 employed for Doppler tracking can be formed by connecting in series a preamplifier, a limiter amplifier, a frequency discriminator and a filtering and matching network (or integrator) which delivers the fine control for frequency locking of the element to be controlled (power laser or local transposition oscillator 24).

What is claimed is:

1. Apparatus for laser telemetry and Doppler measurement with pulse compression, comprising:

transmission means for (a) providing a periodic, pulsed transmission laser wave having a pair of pulses, each pulse of said pair being frequency modulated on both sides of a mean frequency $F_E$, and (b) providing a reference laser wave having a frequency $F_L$;

photomixer means adapted for superheterodyne reception of said reference laser wave and a return laser signal which is the transmission laser wave reflected from a target, said return laser signal having a Doppler shift frequency $F_D$, and for providing a beat signal having a frequency $F_I + F_D$, where $F_I$ is an intermediate frequency of value $F_I = F_E - F_L$;

transposition means for frequency transposing said beat signal and providing a transposed signal to compensate for said Doppler shift, said transposition means first providing a coarse compensation signal having a frequency $F_{DO}$ which is substantially equal to $F_D$, said transposition means then providing an automatic fine compensation signal which compensates for a Doppler difference value $\Delta F_D$ which exists beteeen $F_D$ and $F_{DO}$; and processing means for receiving said transposed signal and for providing an output signal indicative of a distance to said target and said Doppler shift frequency $F_D$ of said target.

2. Apparatus according to claim 1, wherein said transposition means includes (a) an electrically controlled local oscillator, (b) a BLU mixer having first and second inputs, said first input being connected to an output of said photomixer means, and said second input being connected to said electrically controlled local oscillator for producing said transposed signal (c) a Doppler acquisition loop connected between said photomixer means and said controlled local oscillator, (d) tracking loop means for supplying said controlled local oscillator and for receiving said difference value $\Delta F_D$, and (e), within said transmission means, means for transmitting said transmission laser wave and modulating it at a constant frequency during a signal acquisition stage.

3. Apparatus according to claim 2, wherein said acquisition loop includes a high-speed spectrum analyzer for identifying said value $F_{DO}$ from said beat signal and for producing a signal for coarse locking of the controlled local oscillator.

4. Apparatus according to claim 3, wherein said Doppler acquisition loop maintains the coarse-locking signal at its value and produces a control signal which is applied to said means for transmitting and modulating in order to provide a variable-frequency modulated transmission laser wave, and wherein said acquisition loop carries out, in cooperation with said tracking loop, automatic adjustment of said transposition as a function of variations in the Doppler difference value $\Delta F_D$.

5. Apparatus according to claim 3, wherein said transmission means includes (a) acoustooptic modulator means for modulating said transmission laser wave, (b) local oscillator means for producing a local signal at a predetermined local frequency, (c) a first dispersive delay line having a slope $+K$ and an output, (d) a second dispersive delay line having a slope $-K$ and an output, (e) a switching circuit coupled to an output of said local oscillator means in order to (e1) permit said local signal to pass periodically in correspondence with a pair of periodic pulses and (e2) to transmit said local signal alternately to said first dispersive delay line and then to said second dispersive delay line the two delay lines being coupled at their outputs in order to provide a modulating signal to said acoustooptic modulator.

6. Apparatus according to claim 5, wherein said means for transmitting and modulating includes a second switching circuit controlled by the acquisition loop for directly connecting the output of the local oscillator means to the acoustooptic modulator during the acquisition stage.

7. Apparatus according to claim 3, wherein said transmission means includes an acoustooptic modulator, and two dispersive delay lines having opposite slopes for modulating the transmission laser wave in said acoustooptic modulator to produce two Chirp pulses, and wherein said processing means includes a pair of dispersive delay lines in conjugate relationship with said transmission delay lines to carry out demodulation by pulse compression.

8. A system according to claim 3, wherein said transmission means includes a laser generator having a master laser oscillator, a laser wave produced by said laser oscillator being transmitted through a partially reflecting mirror followed by a Faraday isolator to an acoustooptic modulator in order to form said transmission laser wave, a small fraction of said produced laser wave being diverted by the mirror in order to form said reference wave provided to said photomixer means.

9. Apparatus according to claim 3 further including ancillary means for providing a coarse-measurement signal prior to a Doppler shift of said return laser signal reflected from said target, wherein said acquisition loop utilizes a narrow-band spectrum analyzer subject to the need for preliminary transposition of an input signal derived from the photomixer means by a quantity corresponding to said coarse measurement signal.

10. Apparatus according to claim 1 wherein said transmission means provides a transmission laser having a wavelength of approximately 10.6 microns.

* * * * *